US010880151B2

(12) United States Patent
Saito et al.

(10) Patent No.: US 10,880,151 B2
(45) Date of Patent: Dec. 29, 2020

(54) NOTIFICATION CONTROL DEVICE, NOTIFICATION CONTROL SYSTEM, NOTIFICATION CONTROL METHOD, AND STORAGE MEDIUM

(71) Applicant: Yokogawa Electric Corporation, Tokyo (JP)

(72) Inventors: Hiroyuki Saito, Tokyo (JP); Isamu Suzuki, Tokyo (JP); Masanori Sueki, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 193 days.

(21) Appl. No.: 16/138,380

(22) Filed: Sep. 21, 2018

(65) Prior Publication Data

US 2019/0097869 A1 Mar. 28, 2019

(30) Foreign Application Priority Data

Sep. 26, 2017 (JP) ................................ 2017-184651

(51) Int. Cl.
*G06F 15/173* (2006.01)
*H04L 12/24* (2006.01)
(Continued)

(52) U.S. Cl.
CPC ............ *H04L 41/06* (2013.01); *G05B 19/048* (2013.01); *H04L 63/1416* (2013.01);
(Continued)

(58) Field of Classification Search
CPC ..... G05B 23/00; G05B 19/048; G05B 19/406
See application file for complete search history.

(56) References Cited

U.S. PATENT DOCUMENTS

| 8,347,007 B2* | 1/2013 | Takahashi | ......... H04L 12/40013 |
| | | | 710/105 |
| 2014/0018940 A1* | 1/2014 | Casilli | .................... G05B 15/02 |
| | | | 700/29 |

(Continued)

FOREIGN PATENT DOCUMENTS

| JP | 62-22105 A | 1/1987 |
| JP | 2003-27981 A | 1/2003 |

(Continued)

OTHER PUBLICATIONS

Japanese PROFIBUS Organization, "PROFIsafe-Safety Technology for PROFIBUS and PROFINET System Description, Japanese Version, Version20", Jul. 2007.

(Continued)

*Primary Examiner* — Brian Whipple
*Assistant Examiner* — Gregory P Tolchinsky
(74) *Attorney, Agent, or Firm* — Sughrue Mion, PLLC

(57) ABSTRACT

A notification control device includes a first communication status detector configured to detect a status of a first communication protocol of communication between a first device and a second device in a process control system, and a second communication status detector configured to detect a status of a second communication protocol of the communication. The first communication status detector inputs into an operation monitoring terminal first notification information to which tag information is added on the basis of notification common information in which a status of the first communication protocol, a status of the second communication protocol, and the tag information are associated and the detected status of first communication protocol. The second communication status detector inputs into the operation monitoring terminal second notification information to which the tag information is added on the basis of the
(Continued)

notification common information and the detected status of second communication protocol.

16 Claims, 11 Drawing Sheets

(51) Int. Cl.
*G05B 19/048* (2006.01)
*H04L 29/06* (2006.01)
*H04W 12/10* (2009.01)
*G05B 19/418* (2006.01)

(52) U.S. Cl.
CPC .. *G05B 19/418* (2013.01); *G05B 2219/24024* (2013.01); *G05B 2219/25009* (2013.01); *H04W 12/10* (2013.01)

(56) References Cited

U.S. PATENT DOCUMENTS

2016/0316349 A1* 10/2016 Lee ................. H04M 1/575
2016/0370785 A1* 12/2016 Kaufleitner ........ G05B 19/0425
2017/0078455 A1* 3/2017 Fisher .................... H04L 69/03
2017/0142144 A1 5/2017 Weinberger et al.

FOREIGN PATENT DOCUMENTS

| JP | 2006-276957 A | 10/2006 |
|---|---|---|
| JP | 2006-318102 A | 11/2006 |
| JP | 2012-203447 A | 10/2012 |
| JP | 2014-203432 A | 10/2014 |

OTHER PUBLICATIONS

Johan Åkerberg et al., "Efficient integration of secure and safety critical industrial wireless sensor networks", EURASIP Journal on Wireless Communications and Networking, vol. 2011, No. 1, Dec. 1, 2011, XP055530786, DOI: 10.1186/1687-1499-2011-100, 13 pages total.

* cited by examiner

FIG. 2

| TagA | TagB | TagC | ... |
|---|---|---|---|
| Data1 | Data2 | Data3 | ... |
| MEMORY POSITION OF Data1 | MEMORY POSITION OF Data2 | MEMORY POSITION OF Data3 | ... |
| STATUS OF SAFETY COMMUNICATION OF Data1 | STATUS OF SAFETY COMMUNICATION OF Data2 | STATUS OF SAFETY COMMUNICATION OF Data3 | ... |
| STATUS OF PATH OF Data1 | STATUS OF PATH OF Data2 | STATUS OF PATH OF Data3 | ... | t1

FIG. 3

| Data1 | Data2 | Data3 | ... |
|---|---|---|---|
| MEMORY POSITION OF Data1 | MEMORY POSITION OF Data2 | MEMORY POSITION OF Data3 | ... |
| STATUS OF PATH OF Data1 | STATUS OF PATH OF Data2 | STATUS OF PATH OF Data3 | ... | t2

FIG. 4 s1

OCCURRENCE OF SAFETY COMMUNICATION ABNORMALITY ASSOCIATED WITH TagC (ERROR CODE: TIMEOUT)

OCCURRENCE OF PATH ABNORMALITY ASSOCIATED WITH TagC (ERROR CODE: ISA 100.11a COMMUNICATION ABNORMALITY)

FIG. 8

EVENT 1: SAFETY COMMUNICATION ABNORMALITY HAS OCCURRED DUE TO PATH ABNORMALITY.
EVENT 2: PATH ABNORMALITY WHICH DOES NOT DIRECTLY AFFECT SAFETY DATA HAS OCCURRED.
EVENT 3: THIS IS SAME AS EVENT 1.
EVENT 4: THIS IS SAME AS EVENT 2.
EVENT 5: THIS IS SAME AS EVENT 1.
EVENT 6: PATH IS NORMAL BUT SAFETY COMMUNICATION ABNORMALITY HAS OCCURRED.

| LOW PRIORITY | | | HIGH PRIORITY | | t3 |
|---|---|---|---|---|---|
| Data1 | Data3 | ... | Data2 | Data4 | ... |

| AREA A | | | AREA B | | |
|---|---|---|---|---|---|
| Data1 | Data2 | ... | Data3 | Data4 | ... | t4 s3

AREA B

OCCURRENCE OF ABNORMALITY OF PATH FOR FIELD WIRELESS DEVICE 3

OCCURRENCE OF ABNORMALITY OF PATH FOR FIELD WIRELESS DEVICE 4

NOTIFICATION CONTROL DEVICE, NOTIFICATION CONTROL SYSTEM, NOTIFICATION CONTROL METHOD, AND STORAGE MEDIUM

BACKGROUND OF THE INVENTION

Field of the Invention

The present invention relates to a notification control device, a notification control system, a notification control method, and a storage medium.

The present application claims priority based on Japanese patent application 2017-184651, filed on Sep. 26, 2017 and includes herein by reference the content thereof.

Description of Related Art

A system having a safety control function of outputting each of an alarm generated by an abnormality detection logic of safety communication and an alarm generated by an abnormality detection logic of a black channel when a safety communication abnormality occurs in safety communication via a black channel has been provided in a safety instrumented system (SIS) installed in a plant or the like.

The black channel is a communication path based on a principle of the black channel and is shown to be unaffected by a physical layer or a transmission speed in communication. Therefore, in the black channel, safety-related communication is not affected by a bus system or a network device.

Safety communication is safety-related communication adopting the black channel. The safety communication is, for example, safety communication which is performed using "PROFIsafe (registered trademark)" protocol by "PROFINET (registered trademark)" which is industrial Ethernet (registered trademark) defined and managed by PI (PROFIBUS & PROFINET International) or the like. See Specified nonprofit corporation, Japan Profibus Association, "PROFIsafe-Safety Technology for PROFIBUS and PROFINET System Description, Japanese Edition Version 20", July 2007.

FIG. 15 is a schematic diagram showing an alarm notification process of the safety control system according to the related art. As shown, the safety control system according to the related art includes a producing-side safety control station (SCS), a consuming-side safety control station, an operation monitoring terminal, and an engineering terminal. A "producing side" refers to a data transmission side and a "consuming side" refers to a data reception side.

In communication between safety control stations (hereinafter referred to as "inter-SCS communication"), safety communication is performed between a producing-side functional block of the producing-side safety control station and a consuming-side functional block of the consuming-side safety control station and data is securely exchanged at normal times. A transmission source and a reception destination of data are set by an engineer from the engineering terminal.

When end-to-end safety communication is performed between the producing-side functional block and the consuming-side functional block, a safety communication abnormality also occurs as a result of a path abnormality if a path abnormality occurs within a black channel which is a communication path configured for safety communication.

At this time, the operation monitoring terminal detects a path abnormality and generates alarm information indicating the path abnormality. The consuming-side functional block for diagnosing a safety communication abnormality detects a safety communication abnormality and generates alarm information indicating the safety communication abnormality. Each generated alarm is displayed on a monitor of the operation monitoring terminal.

However, although it is possible to cause the monitor of the operation monitoring terminal to display the alarm of a safety communication abnormality and the alarm of a path abnormality in such a configuration of the safety control system according to the related art, it is not possible to display information for associating these alarms. Thus, in the related art, it is difficult for an operator to determine whether or not the alarm of a safety communication abnormality and the alarm of a path abnormality are alarms caused by the same cause (path abnormality).

The alarm of a safety communication abnormality is generated when the safety layer detects an abnormality from the diagnosis of prescribed safety measurement. However, it is difficult to identify a cause of the occurrence of an abnormality and a position of the occurrence of a specific abnormality from the diagnosis of safety measurement only. For example, an alarm for providing a notification of the occurrence of a timeout of safety communication and a cyclic redundancy check (CRC) abnormality of safety data can provide a notification of the occurrence of an event in which data security cannot be secured, but cannot provide a cause of the occurrence of an event. On the other hand, on the black channel side, it is possible to detect the occurrence of a path abnormality leading to the occurrence of a safety communication abnormality and to have information leading to identification of a position of the occurrence by using various diagnostic methods.

To enable the operator to determine whether or not a plurality of pieces of alarm information is alarm information provided through notifications due to the same cause (the occurrence of a path abnormality), an operation of associating the plurality of pieces of alarm information by using design information used when a system is constructed (for example, a system configuration diagram as shown in FIG. 15) or the like is required. Thus, there are cases in which association of the plurality of pieces of alarm information is time-consuming. As a result of the time taken to associate an alarm of a safety communication abnormality with an alarm of a path abnormality, it can be assumed that there may be situations in which troubleshooting is delayed.

The present invention provides a notification control device, a notification control system, a notification control method, and a storage medium capable of outputting information in which notification information generated by different detection logics for the same event are associated.

A notification control device according to a first aspect of the present invention may include a first communication status detector configured to detect a status of a first communication protocol of communication between a first device and a second device in a process control system, and a second communication status detector configured to detect a status of a second communication protocol different from the first communication protocol of the communication. The first communication status detector may be configured to input into an operation monitoring terminal first notification information to which tag information is added on the basis of notification common information in which a status of the first communication protocol, a status of the second communication protocol, and the tag information are associated and the detected status of the first communication protocol. The second communication status detector may be configured to input into the operation monitoring terminal second notification information to which the tag information is added on the basis of the notification common information and the detected status of the second communication protocol.

In the above-described notification control device, the status of the first communication protocol detected by the first communication status detector and the status of the second communication protocol detected by the second communication status detector may be statuses based on the same condition of the communication.

In the above-described notification control device, the first device may be a controller and the second device may be a field device.

In the above-described notification control device, the first communication protocol may be a communication protocol of safety communication, and the first communication status detector may be configured to detect a status of the safety communication.

In the above-described notification control device, the second communication status detector may be configured to detect a status of a communication path in the communication.

The above-described notification control device may further include an alarm generation pre-notifier configured to generate a pre-notification alarm indicating a pre-notification of the status of the first communication protocol on the basis of the tag information associated with the status of the second communication protocol in a case where the second communication status detector has detected the status of the second communication protocol.

The above-described notification control device may further include a common information automatic setter configured to determine whether or not notifications of the detected status of the first communication protocol and the detected status of the second communication protocol have been provided due to the same cause and add common tag information with respect to the detected status of the first communication protocol and the detected status of the second communication protocol in a case where the common information automatic setter determines that the notifications have been provided due to the same cause.

In the above-described notification control device, information indicating a notification priority on the basis of the first notification information or the second notification information may be further associated with the notification common information.

In the above-described notification control device, information indicating an area where the second device is installed may be further associated with the notification common information.

The above-described notification control device, may further include a restoration controller configured to collectively update the first notification information and the second notification information generated on the basis of the status of the first communication protocol and the status of the second communication protocol associated with the same tag information.

A notification control system according to a second aspect of the present invention may include a first device, a second device, a notification control device, and an operation monitoring terminal in a process control system. The notification control device may include a first communication status detector configured to detect a status of a first communication protocol of communication between the first device and the second device, and a second communication status detector configured to detect a status of a second communication protocol different from the first communication protocol of the communication. The first communication status detector may be configured to input into the operation monitoring terminal first notification information to which tag information is added on the basis of notification common information in which a status of the first communication protocol, a status of the second communication protocol, and the tag information are associated and the detected status of the first communication protocol. The second communication status detector may be configured to input into the operation monitoring terminal second notification information to which the tag information is added on the basis of the notification common information and the detected status of the second communication protocol.

The above-described notification control system may further include a communication module configured to store the status of the second communication protocol. The second communication status detector may be configured to refer to the status of the second communication protocol stored in the communication module to detect the status of the second communication protocol.

The above-described notification control system may further include an engineering terminal configured to associate the status of the first communication protocol, the status of the second communication protocol, and the tag information.

A notification control method using a computer according to a third aspect of the present invention may include detecting a status of a first communication protocol of communication between a first device and a second device in a process control system, detecting a status of a second communication protocol different from the first communication protocol of the communication, inputting into an operation monitoring terminal first notification information to which tag information is added on the basis of notification common information in which a status of the first communication protocol, a status of the second communication protocol, and the tag information are associated and the detected status of the first communication protocol, and inputting into the operation monitoring terminal second notification information to which the tag information is added on the basis of the notification common information and the detected status of the second communication protocol.

A non-transitory computer-readable storage medium according to a fourth aspect of the present invention may include store a notification control program, which when executed by a computer, causes the computer to perform detecting a status of a first communication protocol of communication between a first device and a second device in a process control system, detecting a status of a second communication protocol different from the first communication protocol of the communication, inputting into an operation monitoring terminal first notification information to which tag information is added on the basis of notification common information in which a status of the first communication protocol, a status of the second communication protocol, and the tag information are associated and the detected status of the first communication protocol, and inputting into the operation monitoring terminal second notification information to which the tag information is added on the basis of the notification common information and the detected status of the second communication protocol.

According to the one aspect of the present invention, it is possible to output information in which notification information generated by different detection logics for the same event are associated.

BRIEF DESCRIPTION OF THE DRAWINGS

FIG. 2 is a schematic diagram showing a configuration of alarm common information stored in a safety control station of the safety control system according to the first embodiment of the present invention.

FIG. 3 is a schematic diagram showing an example of temporary information stored in a communication module of the safety control system according to the first embodiment of the present invention.

FIG. 4 is a schematic diagram showing an example of an alarm information display screen displayed on an operation monitoring terminal of the safety control system according to the first embodiment of the present invention.

FIG. 8 is a diagram showing an example of details of an event determined by the determination logic shown in FIG. 7.

DETAILED DESCRIPTION OF THE INVENTION

First Embodiment

Hereinafter, a first embodiment of the present invention will be described.

Although a safety control system 1a provided in a safety instrumented system installed in a plant will be described as an example in the present embodiment, the present invention is not limited thereto and the present invention may be applied to any safety control system including a plurality of abnormality detection logics (for example, a distributed control system (DCS) or the like).

[Configuration of Safety Control System]

Hereinafter, an overall configuration of a safety control system 1a will be described with reference to the drawings.

Figure 1:
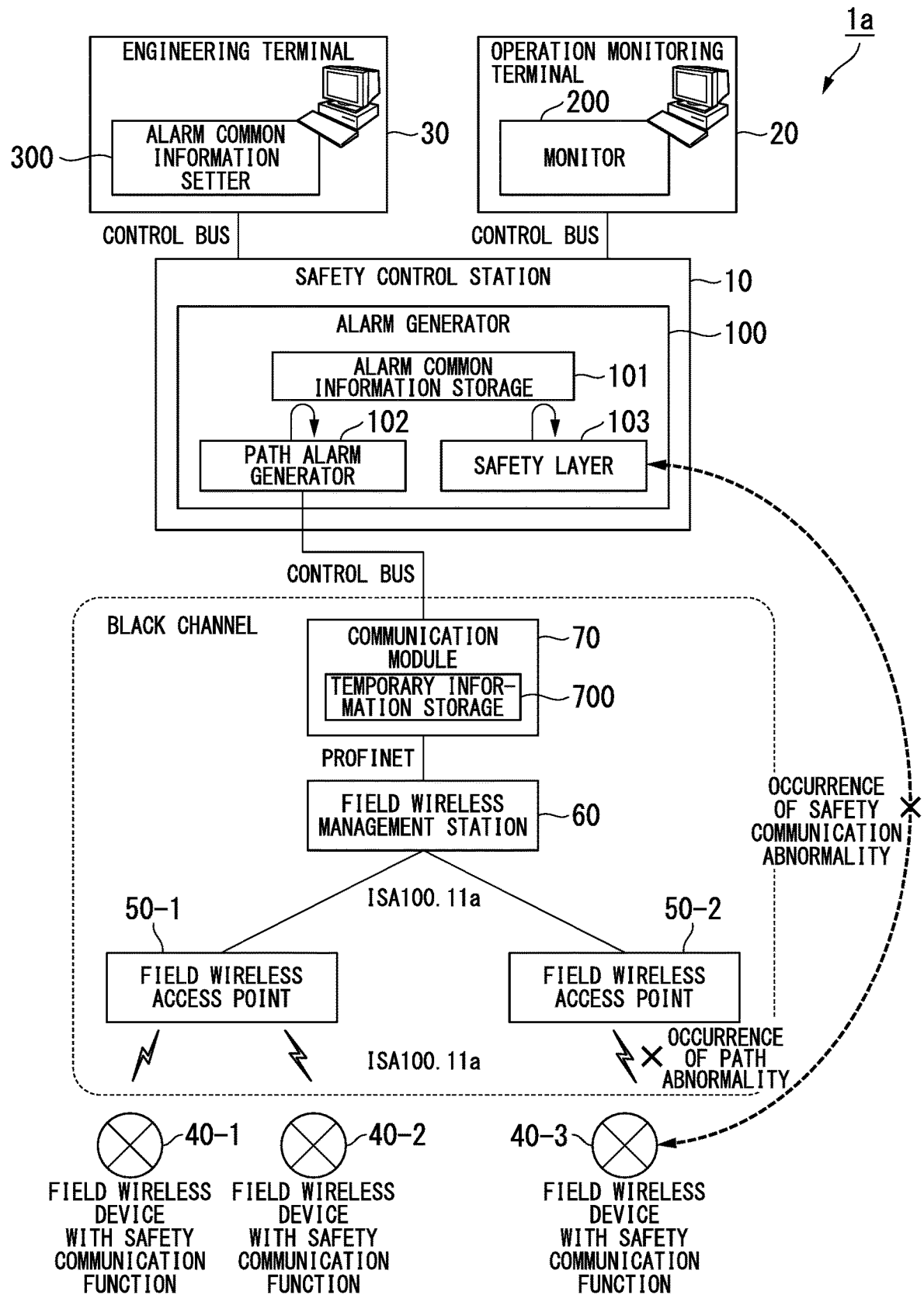
FIG. 1 is a configuration diagram showing an overall configuration of a safety control system according to a first embodiment of the present invention.

FIG. 1 is a configuration diagram showing the overall configuration of the safety control system 1a according to the first embodiment of the present invention.

As shown, the safety control system 1a (a notification control system) includes a safety control station 10 (a controller (a first device)), an operation monitoring terminal 20, an engineering terminal 30, field wireless devices 40-1 to 40-3 with safety communication function (second devices) (hereinafter, simply referred to as "field wireless devices 40 with safety communication function" unless it is necessary to distinguish them separately) and field wireless access points 50-1 and 50-2 (hereinafter, simply referred to as "field wireless access points 50" unless it is necessary to distinguish them separately), a field wireless management station 60, and a communication module 70.

As shown in FIG. 1, communication connections between the safety control station 10, the operation monitoring terminal 20, the engineering terminal 30, and the communication module 70 are established via a control bus. A communication connection between the communication module 70 and the field wireless management station 60 is established through PROFINET (registered trademark) which is industrial Ethernet (registered trademark) defined by PI. Communication connections between the field wireless access point 50, the field wireless management station 60, and the field wireless device 40 with safety communication function are established through a communication network defined by International Society of Automation (ISA) 100.11a which is a wireless communication standard.

As shown in FIG. 1, because a path between the safety control station 10 and the field wireless device 40 with safety communication function is a communication path based on a principle of the black channel, a configuration different from the above-described configuration may be provided.

Although end-to-end safety communication is performed between a producing-side functional block and a consuming-side functional block in the above-described related art, communication between a safety layer 103 of the safety control station 10 to be described below and the field wireless device 40 with safety communication function is assumed to be a target of end-to-end safety communication in the present embodiment.

As shown in FIG. 1, the safety control station 10 (a notification control device) according to the present embodiment detects a status of safety communication such as a safety communication abnormality in communication with the field wireless device 40 with safety communication function (a status of a first communication protocol). For example, the safety control station 10 detects the timeout of safety communication, the occurrence of a CRC abnormality of safety data, and the like. The safety communication is performed using, for example, a communication protocol based on PROFIsafe (registered trademark).

The safety control station 10 detects a status of a communication path such as a path abnormality in the communication (a status of a second communication protocol). For example, the safety control station 10 detects the occurrence of a path abnormality leading to the occurrence of a safety communication abnormality, a position of the occurrence thereof, and the like. The safety control station 10 generates a safety communication abnormality alarm (first notification information) to which tag information is added on the basis of alarm common information (notification common information) in which the status of the first communication protocol, the status of the second communication protocol, and the tag information are associated and the detected status of the first communication protocol and outputs the generated safety communication abnormality alarm to the operation monitoring terminal 20. The safety control station 10 generates a path abnormality alarm (second notification information) to which tag information is added on the basis of the alarm common information and the detected status of the second communication protocol and outputs the generated path abnormality alarm to the operation monitoring terminal 20.

The term "abnormality" described here indicates a state that is not a normal status.

In the present embodiment, it is assumed that a safety communication abnormality alarm is necessarily generated and issued if a safety communication abnormality has occurred and a path abnormality alarm is necessarily generated and issued if a path abnormality has occurred.

In this manner, the safety control station 10 according to the present embodiment outputs information in which alarm information (tag information) generated through detection of a plurality of different detection logics with respect to the same event is associated. Hereinafter, the configuration of the safety control station 10 will be described in more detail.

As shown in FIG. 1, the safety control station 10 includes an alarm generator 100. The alarm generator 100 has the above-described function of detecting a status of safety communication, detecting a status of a communication path (hereinafter also simply referred to as a "path"), generating a safety communication alarm, and generating a path abnormality alarm.

As shown in FIG. 1, the alarm generator 100 includes an alarm common information storage 101, a path alarm generator 102, and the safety layer 103.

The alarm common information storage 101 stores alarm common information t1. The alarm common information storage 101 includes a storage medium, for example, a hard disk drive (HDD), a flash memory, an electrically erasable programmable read only memory (EEPROM)), a random access read/write memory (RAM: readable/writable memory), a read only memory (ROM), or any combination of these storage media.

The configuration of the alarm common information t1 will be described below.

FIG. 2 is a schematic diagram showing a configuration of the alarm common information t1 stored in the safety control station 10 of the safety control system 1a according to the first embodiment of the present invention.

As shown, the alarm common information t1 is two-dimensional tabular data in which five items of a tag ("Tag A", "Tag B", "Tag C", or the like) and a type of data ("Data 1", "Data 2", "Data 3" or the like), a memory position of data (a "memory position of Data 1", a "memory position of Data 2", a "memory position of Data 3", or the like), a status of safety communication (a "status of safety communication of Data 1", a "status of safety communication of Data 2", a "status of the safety communication of Data 3", or the like), and a status of a path (a "status of a path of Data 1", a "status of a path of Data 2", a "status of a path of Data 3", or the like) are associated.

In the item of the type of data, information indicating the type of data is stored as a value. That is, in the item of the type of data, information indicating a field wireless device 40 with safety communication function which is a source of an input value or information indicating a field wireless device 40 with safety communication function which is a destination of an output value is stored as a value. For example, in the item of the type of data, information indicating "which process value item (for example, a measurement item) of which field wireless device with safety communication function" is stored.

In the item of the tag, a value set in association with the item of the above-described type of data (for example, any character string) is stored by a user (an engineer). The user makes a setting for associating a tag with the item of the type of data with the alarm common information setter 300 provided in the engineering terminal 30.

In the safety control system 1a, it is desirable that the tag have a unique value. For example, a device tag may be set as the tag. Because the device tag has a unique value in the system, it becomes appropriate tag information as a key when a related alarm is associated. Because the device tag is given within an alarm message, there is an advantage that the user (an operator) can easily identify a position where an abnormality occurs.

In the item of the memory position of the data, so-called pointer information indicating a memory position where actual data associated with the information stored as the value of the item of the above-described type of data (raw data (for example, a process value)) is stored is stored as a value. A value obtained from the field wireless device 40 with safety communication function (raw data) is stored, for example, in the storage (not shown) of the safety control station 10. The value obtained from the field wireless device 40 with safety communication function (raw data) may be stored in an external device (not shown).

In the item of the status of the safety communication, information indicating the latest status of the safety communication detected by the safety layer 103 is stored as a value.

In the item of the status of the path, information indicating the latest status of the path detected by the path alarm generator 102 is stored as a value.

Description will be given with reference to FIG. 1 again.

The path alarm generator 102 (a second communication status detector) acquires information indicating the status of the path from the communication module 70 periodically (for example, every 250 milliseconds), thereby detecting the latest status of the path. The path alarm generator 102 updates the status of the path stored in the above-described alarm common information t1 according to the acquired information indicating the status of the path.

The safety layer 103 (a first communication status detector) periodically detects the status of safety communication with the field wireless device 40 with safety communication function via the black channel. The safety layer 103 updates the status of the safety communication of the alarm common information t1 stored in the above-described alarm common information storage 101 according to the acquired information indicating the status of the safety communication.

The operation monitoring terminal 20 includes a monitor 200. The operation monitoring terminal 20 acquires various types of alarm information from the safety control station 10 via the control bus.

The operation monitoring terminal 20 causes the monitor 200 to display various types of acquired alarm information. Various types of acquired alarm information may be output by, for example, a speaker or the like, by speech.

The operation monitoring terminal 20 includes an information processing device, for example, a general-purpose computer or a personal computer. The operation monitoring terminal 20 may include a portable information processing device, for example, a smartphone, a tablet type compact information terminal, or the like.

The monitor 200 includes a display, for example, a liquid crystal display (LCD), an organic electroluminescence (EL) display, a cathode ray tube (CRT), or the like.

The engineering terminal 30 includes an alarm common information setter 300. The user (the engineer) defines a value of the item of the "type of data" of the above-described alarm common information t1 with the alarm common information setter 300 and sets any value for the item of the "tag" (tag information) with respect to the defined value. Information indicating the value of the item of the "type of data" and the value of the item of the "tag" associated by the user is transmitted to the alarm generator 100 of the safety control station 10 via the control bus. When the information transmitted from the engineering terminal 30 is acquired, the alarm generator 100 adds the value of the item of the "type of data" and the value of the item of "tag" based on the acquired information to the item of the "type of data" and the item of the "tag" of the alarm common information t1 stored in the alarm common information storage 101.

The value of the item of the memory position of the data described above is set by the operation monitoring terminal 20, for example, at the timing at which the tag information has been set. Information indicating the value of the item of the memory position of the data output from the operation monitoring terminal 20 is transmitted to the safety control station 10 via the control bus and set in the alarm common information t1 of the alarm common information storage 101. Also, the safety control station 10 transmits information indicating the value of the item of the memory position of the data to the communication module 70 via the control bus.

The engineering terminal 30 includes an information processing device, for example, a general-purpose computer or a personal computer. The engineering terminal 30 may include a portable information processing device, for example, a smartphone, a tablet type compact information terminal, or the like.

The alarm common information setter 300 includes a member capable of receiving an operation input from the user, for example, a keyboard, a mouse, a pointing device, a touch panel, or the like.

The field wireless device 40 with safety communication function is a field device capable of performing wireless communication in conformance with safety communication. In particular, the field wireless device 40 with safety communication function performs safety communication with the safety layer 103 of the safety control station 10. The field wireless device 40 with safety communication function establishes a communication connection with the field wireless access point 50 through a communication network defined in ISA 100.11a and transmits data such as measured process values.

The field wireless device 40 with safety communication function includes, for example, a measurement device such as a flow meter or a pressure gauge.

The field wireless access point 50 establishes a communication connection with the field wireless device 40 with safety communication function via a communication network defined in ISA 100.11a to acquire data such as a process value. For example, as shown in FIG. 1, the field wireless access point 50-1 establishes a communication connection with the field wireless devices 40-1 to 40-2 with safety communication function and the field wireless access point 50-2 establishes a communication connection with the field wireless device 40-3 with safety communication function.

The field wireless access point 50 establishes a communication connection with the field wireless management station 60 through a communication network defined in ISA 100.11a and transmits data such as the above-described acquired process value.

The field wireless management station 60 establishes a communication connection with the field wireless access point 50 through a communication network defined in ISA 100.11a to acquire data such as a process value measured by the field wireless device 40 with safety communication function. The field wireless management station 60 transmits data such as the above-described acquired process value to the communication module 70 via PROFINET (registered trademark).

The field wireless management station 60 periodically determines the status of the path by monitoring the status of the communication connection with the field wireless access point 50. The field wireless management station 60 transmits information indicating the determined status of the path to the communication module 70 via PROFINET (registered trademark).

The information indicating the status of the path described here is information in which a plurality of pieces of information (indicating the statuses of the paths) is accumulated. Consequently, information indicating an element which is at a position of an abnormality is required to be included in information indicating the status of the path when an abnormality occurs if there are a plurality of elements on the path. It is possible to determine which position is a position of an abnormality according to an error code added when an abnormality has been detected.

The communication module 70 includes a temporary information storage 700.

The temporary information storage 700 stores temporary information t2. The temporary information storage 700 includes a storage medium, for example, an HDD, a flash memory, an EEPROM, a RAM, a ROM, or any combination of these storage media.

Hereinafter, a configuration of the temporary information t2 will be described.

FIG. 3 is a schematic diagram showing an example of the temporary information t2 stored in the communication module 70 of the safety control system 1a according to the first embodiment of the present invention.

As shown, the temporary information t2 is two-dimensional tabular data in which three items of a type of data ("Data 1", "Data 2", "Data 3" or the like), a memory position of data (a "memory position of Data 1", a "memory position of Data 2", a "memory position of Data 3", or the like), and a status of a path (a "status of a path of Data 1", a "status of a path of Data 2", a "status of a path of Data 3", or the like) are associated.

The item of the type of data is an item corresponding to the item of the type of data set in the alarm common information t1 shown in FIG. 2, and information indicating a type of data is stored as a value in the item of the type of data. That is, in the item of the type of data, information indicating a field wireless device 40 with safety communication function which is a source of an input value or information indicating a field wireless device 40 with safety communication function which is a source of an output value is stored as a value. For example, in the item of the type of data, information indicating "which process value item (for example, a measurement item) of which field wireless device with safety communication function" is stored.

In the item of the memory position of the data, so-called pointer information indicating a memory position where actual data corresponding to the information stored as the value of the item of the above-described type of data (raw data (for example, a process value)) is stored is stored as a value. A value obtained from the field wireless device 40 with safety communication function (raw data) is temporarily stored, for example, in the storage (not shown) of the communication module 70.

In the item of the status of the path, information indicating the latest status of the path (between the field wireless device 40 with safety communication function and the field wireless management station 60) determined by the field wireless management station 60 is stored as a value. In the item of the status of the path, information indicating the latest status of the path between the field wireless management station 60 and the communication module 70 determined by the communication module 70 is stored as a value.

Description will be given with reference to FIG. 1 again.

The communication module 70 acquires data (raw data) such as process values measured by the field wireless device 40 with safety communication function from the field wireless management station 60 via PROFINET (registered trademark). The communication module 70 transmits data such as the acquired process values to the safety control station 10 via the control bus.

The communication module 70 acquires information indicating the status of the path determined by the field wireless management station 60 from the field wireless management station 60 via PROFINET (registered trademark). The communication module 70 determines the status of the path between the field wireless management station 60 and the communication module 70, and generates information indicating the determined status of the path. The communication module 70 updates the status of the path of the temporary information t2 stored in the temporary information storage 700 according to information indicating the acquired status of the path and information indicating the determined status of the path.

As described above, the information indicating the status of the path is information in which a plurality of pieces of information (indicating the status of the path) are accumulated. Consequently, information indicating an element which is a position of an abnormality is required to be included in information indicating the status of the path when the abnormality occurs if there are a plurality of elements on the path. As described above, it is possible to determine which position is a position of an abnormality according to an error code added when an abnormality has been detected.

The path alarm generator 102 of the alarm generator 100 of the safety control station 10 acquires information indicating the status of the path periodically (for example, every 250 ms) from the temporary information t2 stored in the temporary information storage 700 of the communication module 70. The path alarm generator 102 updates the status of the path stored in the alarm common information t1 stored in the alarm common information storage 101 of the alarm generator 100 according to the acquired information indicating the status of the path.

Although the communication module 70 includes the temporary information storage 700 and temporarily stores information indicating the status of the path or the like in the present embodiment, the present invention is not limited thereto. For example, every time the communication module 70 acquires information indicating the status of the path from the field wireless management station 60 and every time the communication module 70 generates information indicating the status of the path between the field wireless management station 60 and the communication module 70, the acquired information indicating the status of the path and the generated information indicating the status of the path may be sequentially transmitted to the safety control station 10 via the control bus.

As shown in FIG. 1, for example, it is assumed that a path abnormality has occurred between the field wireless device 40-3 with safety communication function and the field wireless access point 50-2.

In this case, the safety layer 103 detects a safety communication abnormality caused by a path abnormality. The safety layer 103 updates the status of the safety communication of the alarm common information t1 stored in the alarm common information storage 101 described above according to the acquired information indicating the status of the safety communication.

In this case, the field wireless management station 60 monitors the status of a communication connection with the field wireless access point 50-2, and transmits information indicating the status of the path obtained through monitoring to the communication module 70. The communication module 70 acquires information indicating the status of the path from the field wireless management station 60. The communication module 70 monitors the status of a communication connection with the field wireless management station 60 and generates information indicating the status of the path obtained through monitoring.

The communication module 70 updates the status of the path of the temporary information t2 stored in the temporary information storage 700 according to the acquired information indicating the status of the path and the generated information indicating the status of the path.

The path alarm generator 102 of the alarm generator 100 of the safety control station 10 acquires information indicating the status of the path from the temporary information t2 stored in the temporary information storage 700 of the communication module 70. The path alarm generator 102 updates the status of the path of the alarm common information t1 stored in the alarm common information storage 101 of the alarm generator 100 according to the acquired information indicating the status of the path. At this time, the path alarm generator 102 detects the occurrence of a path abnormality by recognizing that the information indicating the status of the path of the alarm common information t1 has been updated from a state indicating normality to a state indicating abnormality.

As described above, the alarm generator 100 detects that a safety communication abnormality and a path abnormality have occurred with the safety layer 103 and the path alarm generator 102.

The alarm generator 100 generates alarm information of safety communication on the basis of the value of the item of the status of the safety communication and the value of the item of the tag associated with the item of the status of the safety communication. The alarm generator 100 generates alarm information of a path on the basis of the value of the item of the status of the path and the value of the item of the tag associated with the item of the status of the path.

If it is detected that the safety communication status has been updated from the normal status to the abnormal status in the alarm common information t1, the alarm generator 100 generates alarm information for providing a notification of the occurrence of the safety communication abnormality. If it is detected that the status of the safety communication has been updated from the abnormal status to the normal status in the alarm common information t1, the alarm generator 100 generates alarm information for providing a notification of restoration from the safety communication abnormality.

If it is detected that the status of the path has been updated from the normal status to the abnormal status in the alarm common information t1, the alarm generator 100 generates alarm information for providing a notification of the occurrence of the path abnormality. If it is detected that the status of the path has been updated from the abnormal status to the normal status in the alarm common information t1, the alarm generator 100 generates alarm information for providing a notification of the restoration from the path abnormality.

The alarm generator 100 transmits the generated alarm information of the safety communication and the generated alarm information of the path to the operation monitoring terminal 20 via the control bus.

The operation monitoring terminal 20 acquires alarm information of safety communication and alarm information of a path from the alarm generator 100 of the safety control station 10 via the control bus. The operation monitoring terminal 20 causes the monitor 200 to display the acquired alarm information of the safety communication and the acquired alarm information of the path.

An example of alarm information displayed on the monitor 200 will be described below.

FIG. 4 is a schematic diagram showing an example of an alarm information display screen s1 displayed on the operation monitoring terminal 20 of the safety control system 1a according to the first embodiment of the present invention.

As shown, safety communication alarm information indicating the "occurrence of safety communication abnormality with Tag C (error code: timeout)" and path abnormality alarm information indicating the "occurrence of path abnormality with Tag C (error code: ISA 100.11a communication abnormality)" are displayed on the alarm information display screen s1.

In the safety control system 1a according to the present embodiment, the tag information defined in the alarm common information t1 ("Tag C" in FIG. 4) is output as described above. Thereby, the user (the operator) can recognize that the safety communication alarm information and the path alarm information displayed on the monitor 200 of the operation monitoring terminal 20 are alarm information generated on the basis of the same event (for example, the occurrence of a path abnormality).

In the safety control system 1a according to the present embodiment, as described above, error codes generated in detection of a safety communication abnormality and detection of a path abnormality are output. Thereby, the user can narrow down a position where the occurrence of the abnormality is caused.

For example, because the user can recognize that a safety communication abnormality associated with "Tag C" has occurred from the alarm information shown in FIG. 4, it is possible to recognize that the safety communication abnormality has occurred between the field wireless device 40-3 with safety communication function and the safety control station 10 shown in FIG. 1. Here, in the alarm common information t1, "Tag C" is assumed to be associated with the field wireless device 40-3 with safety communication function.

Furthermore, the user can recognize that a path abnormality in "ISA 100.11a" has occurred from the alarm information shown in FIG. 4.

Figure 5:
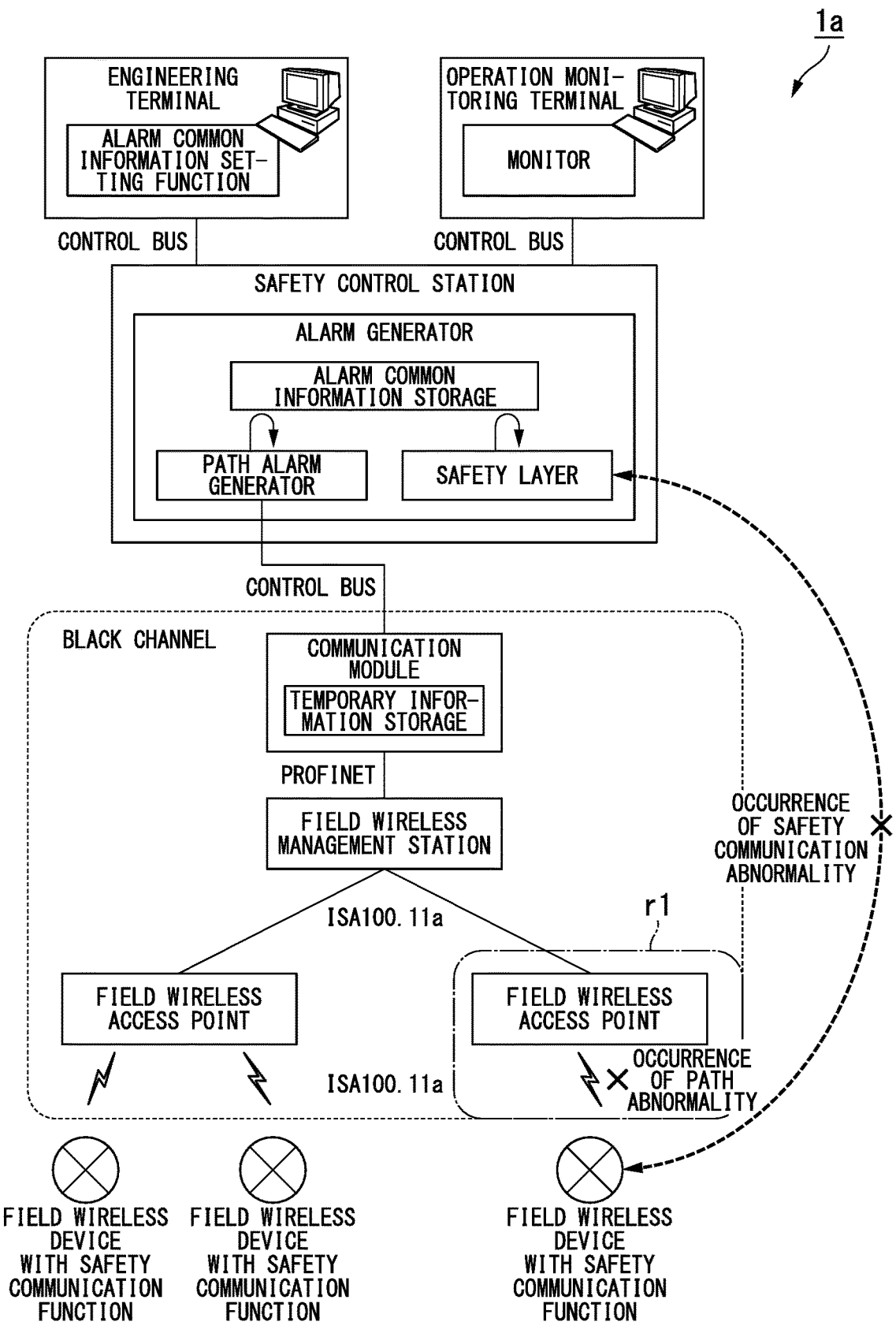
FIG. 5 is a schematic diagram showing an example of a position of the occurrence of an abnormality identified by the safety control system according to the first embodiment of the present invention.

FIG. 5 is a schematic diagram showing an example of a position of the occurrence of an abnormality identified by the safety control system 1a according to the first embodiment of the present invention. As described above, the user can recognize from the alarm information shown in FIG. 4 that a safety communication abnormality has occurred between the field wireless device 40-3 with safety communication function and the safety control station 10 and that the path abnormality in "ISA 100.11a" has occurred, thereby narrowing down the identification of the position of the path abnormality. In this case it is possible to identify that the path abnormality has occurred in any one of ranges of an area r1 shown in FIG. 5.

[Operation of Safety Control Station]

Hereinafter, the operation of the safety control station 10 will be described.

Figure 6A:
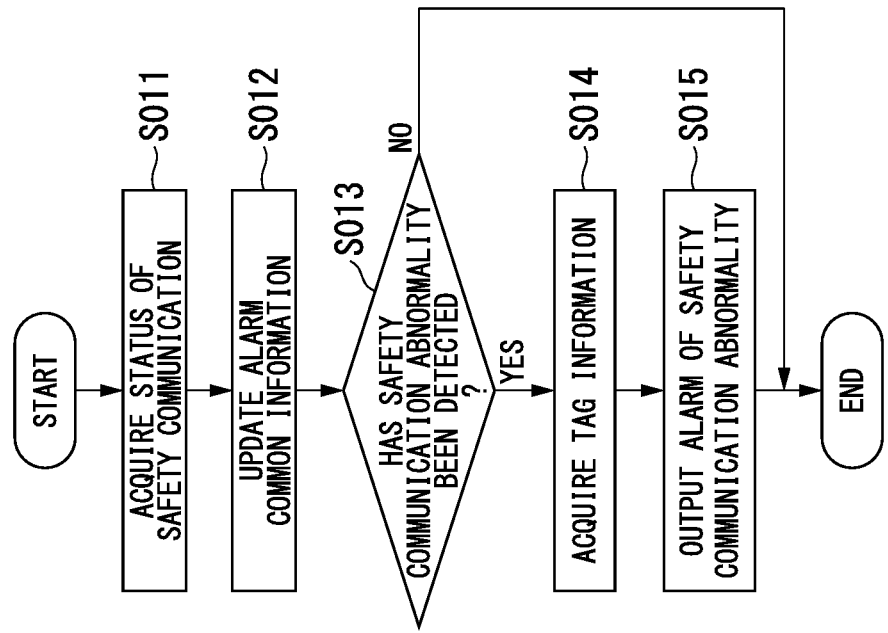
FIG. 6A is a flowchart showing an operation of a safety control station of the safety control system according to the first embodiment of the present invention.
Figure 6B:
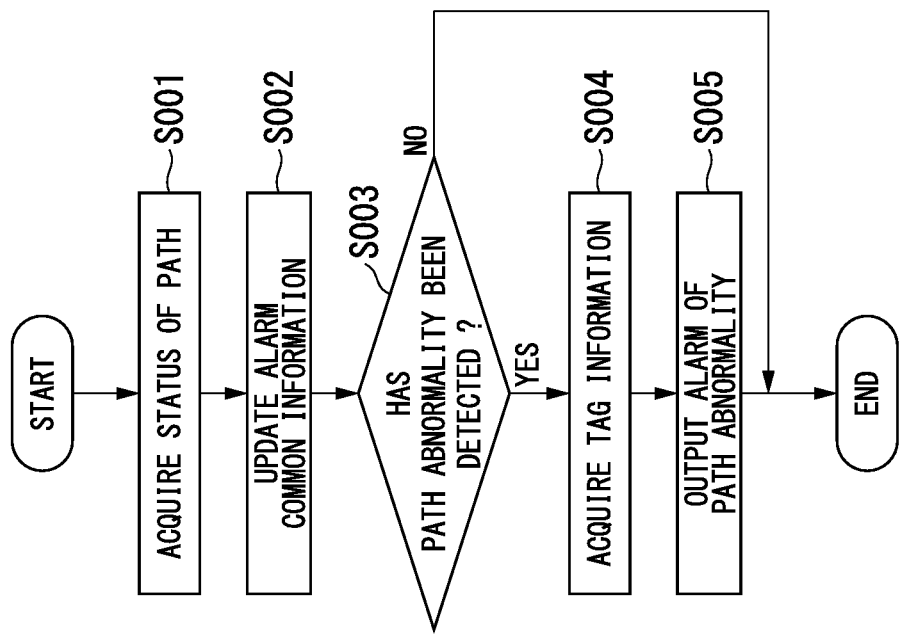
FIG. 6B is a flowchart showing an operation of a safety control station of the safety control system according to the first embodiment of the present invention.

FIGS. 6A and 6B are a flowchart showing the operation of the safety control station 10 of the safety control system 1a according to the first embodiment of the present invention.

FIG. 6A is a flowchart showing the operation of the safety control station 10 when the status of the path is acquired. For example, the process of the present flowchart is started periodically (for example, every 250 milliseconds) on the basis of an instruction from a timer (not shown) provided in the safety control station 10.

(Step S001) The path alarm generator 102 of the alarm generator 100 acquires information indicating the status of the path from the temporary information t2 stored in the temporary information storage 700 of the communication module 70. Thereafter, the process proceeds to step S002.

(Step S002) The path alarm generator 102 of the alarm generator 100 updates information indicating the status of the path of the alarm common information t1 stored in the alarm common information storage 101 according to the information indicating the status of the path acquired in step S001. Thereafter, the process proceeds to step S003.

(Step S003) The alarm generator 100 recognizes that a path abnormality is detected by searching for the status of the path indicating the path abnormality in the alarm common information t1 stored in the alarm common information storage 101. If the path abnormality is detected, the process proceeds to step S004. Otherwise, the process of the present flowchart ends.

(Step S004) In the alarm common information t1 stored in the alarm common information storage 101, the alarm generator 100 acquires tag information associated with the status of the path indicating that the path abnormality has been detected. Thereafter, the process proceeds to step S005.

(Step S005) The alarm generator 100 generates path alarm information to which the tag information acquired in step S004 is added. The alarm generator 100 outputs the generated alarm information to the operation monitoring terminal 20 via the control bus.

The process of the present flowchart is completed.

FIG. 6B is a flowchart showing the operation of the safety control station 10 when the status of the safety communication is acquired. For example, the process of the present flowchart is started periodically (for example, every 250 milliseconds) on the basis of an instruction from a timer (not shown) provided in the safety control station 10.

(Step S011) The safety layer 103 of the alarm generator 100 acquires information indicating the status of safety communication with the field wireless device 40 with safety communication function via the black channel. Thereafter, the process proceeds to step S012.

(Step S012) The safety layer 103 of the alarm generator 100 updates information indicating the status of the safety communication in the alarm common information t1 stored in the alarm common information storage 101 according to the information indicating the status of the safety communication acquired in step S011. Thereafter, the process proceeds to step S013.

(Step S013) The alarm generator 100 recognizes that the safety communication abnormality has been detected by searching for the status of the safety communication indicating the safety communication abnormality in the alarm common information t1 stored in the alarm common information storage 101. If the safety communication abnormality has been detected, the process proceeds to step S014. Otherwise, the process of the present flowchart ends.

(Step S014) In the alarm common information t1 stored in the alarm common information storage 101, the alarm generator 100 acquires the tag information associated with the status of the safety communication indicating that the safety communication abnormality has been detected. Thereafter, the process proceeds to step S015.

(Step S015) The alarm generator 100 generates safety communication alarm information to which the tag information acquired in step S014 is added. The alarm generator 100 outputs the generated alarm information to the operation monitoring terminal 20 via the control bus.

Accordingly, the process of the present flowchart is completed.

As indicated by the above-described operation, the path alarm generator 102 and the safety layer 103 of the safety control station 10 separately operate and provide a notification of an alarm as necessary.

[Determination Logic of Event Used by Operator]

Hereinafter, a determination logic used by the operator when an event which has occurred is determined in a case in which the safety control system 1a provides a notification of alarm information will be described.

Figure 7:
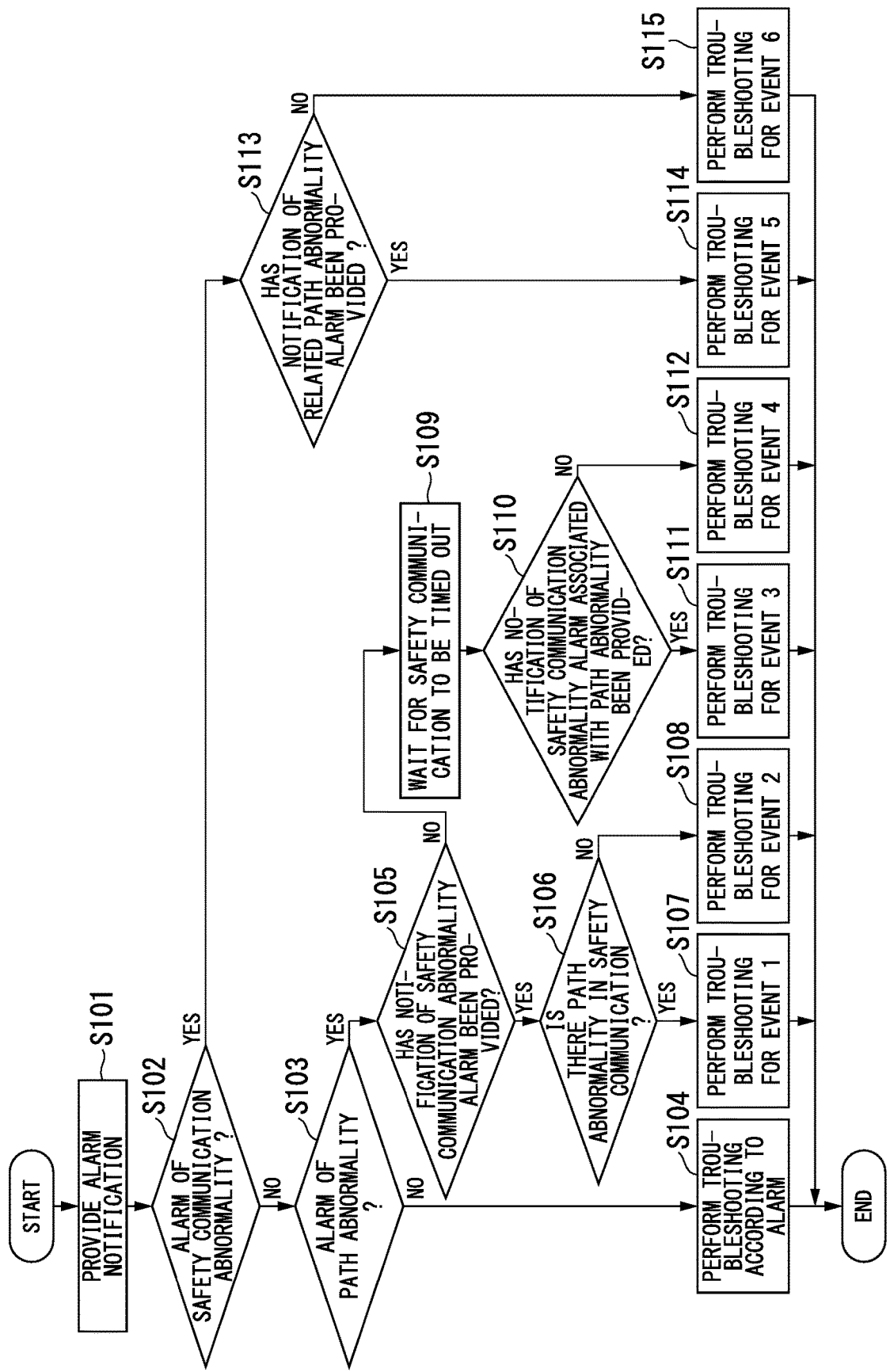
FIG. 7 is a diagram showing a determination logic to be used by an operator when an event is determined on the basis of alarm information provided through a notification of the safety control system according to the first embodiment of the present invention.

FIG. 7 is a diagram showing the determination logic to be used by the operator when an event is determined on the basis of alarm information provided through a notification of the safety control system 1a according to the first embodiment of the present invention. The present flowchart is started when the operation monitoring terminal 20 acquires alarm information from the safety control station 10.

(Step S101) The operation monitoring terminal 20 provides a notification of the alarm information by casing the monitor 200 to display the acquired alarm information. Thereafter, the process proceeds to step S102.

(Step S102) If the alarm information provided through the notification in step S102 is alarm information of a safety communication abnormality, the process proceeds to step S113. Otherwise, the process proceeds to step S103.

(Step S103) When the alarm information provided through the notification in step S102 is path abnormality alarm information, the process proceeds to step S105. Otherwise, the process proceeds to step S104.

(Step S104) The operator recognizes that the alarm information is other alarm information which is not alarm information based on a safety communication abnormality and a path abnormality and performs troubleshooting according to other alarm information provided through the notification. Thus, the determination of the event by the operator based on the present flowchart ends.

(Step S105) If the notification of the alarm information of the safety communication abnormality is provided together with the alarm information provided through the notification in step S102, the process proceeds to step S106. Otherwise, the process proceeds to step S109.

(Step S106) If the alarm information of the path abnormality is a path abnormality related to the safety communication (that is, if the same tag information is added to the alarm information of the path and the alarm information of the safety communication), the process proceeds to step S107. Otherwise, the process proceeds to step S108.

(Step S107) The operator determines that the event 1 has occurred and performs troubleshooting for the event 1. The details of each event will be described below. Thus, the determination of the event by the operator based on the present flowchart ends.

(Step S108) The operator determines that the event 2 has occurred, and performs troubleshooting for the event 2. Thus, the determination of the event by the operator based on the present flowchart ends.

(Step S109) The operator waits until the safety communication is timed out. Thereafter, the process proceeds to step S110.

(Step S110) If the notification of a safety communication abnormality alarm related to the path abnormality has been provided, the process proceeds to step S111. Otherwise, the process proceeds to step S112.

(Step S111) The operator determines that the event 3 has occurred and performs troubleshooting for the event 3. Thus, the determination of the event by the operator based on the present flowchart ends.

(Step S112) The operator determines that the event 4 has occurred, and performs troubleshooting for the event 4. Thus, the determination of the event by the operator based on the present flowchart ends.

(Step S113) If a notification of the alarm information of the path abnormality related to the alarm information of the safety communication abnormality provided through the notification has been provided (i.e., if the notification of the alarm information of the path abnormality to which the same tag information as the tag information added to the alarm information of the safety communication is added has been provided), the process proceeds to step S114. Otherwise, the process proceeds to step S115.

The present flowchart does not contain a determination logic for an operator to wait until a notification of a path abnormality alarm is provided because a notification of a path abnormality alarm to be provided when the path abnormality occurs is usually provided immediately after the occurrence of the path abnormality. However, of course, it is possible to place a logic for waiting for a predetermined time until a path abnormality alarm occurs in the present flowchart.

(Step S114) The operator determines that the event 5 has occurred and performs troubleshooting for the event 5. Thus, the determination of the event by the operator based on the present flowchart ends.

(Step S115) The operator determines that the event 6 has occurred and performs troubleshooting for the event 6.

Thus, the determination of the event by the operator based on the present flowchart ends.

FIG. 8 is a diagram showing an example of details of the event determined by the determination logic shown in FIG. 7.

For example, as shown in FIG. 8, each of the above-described events 1 to 6 is an event of details indicating that the event 1 is an event of details indicating a "safety communication abnormality due to a path abnormality has occurred", the event 2 is an event of details indicating that a "path abnormality which does not directly affect safety data has occurred", and the event 3 is the same as the event 1, the event 4 is the same as the event 2, the event 5 is the same as the event 1, and the event 6 is an event of details indicating that a "path is normal, but a safety communication abnormality has occurred".

The above-described safety data is, for example, a process value measured by the field wireless device 40 with safety communication function. Also, the path abnormality which does not directly affect the above-described safety data represents an abnormality of a path which is not used for acquiring the safety data.

Path abnormality miss notification is, for example, notifying the safety control station 10 that the communication module 70 malfunctions and a path in the normal state is abnormal or the like.

According to the safety control system 1*a* according to the present embodiment, it is possible to reduce a load on the operator required for the determination in steps S105, S106, and S113 in the flowchart showing the determination logic shown in FIG. 7.

Second Embodiment

Hereinafter, a second embodiment of the present invention will be described.

Figure 9:
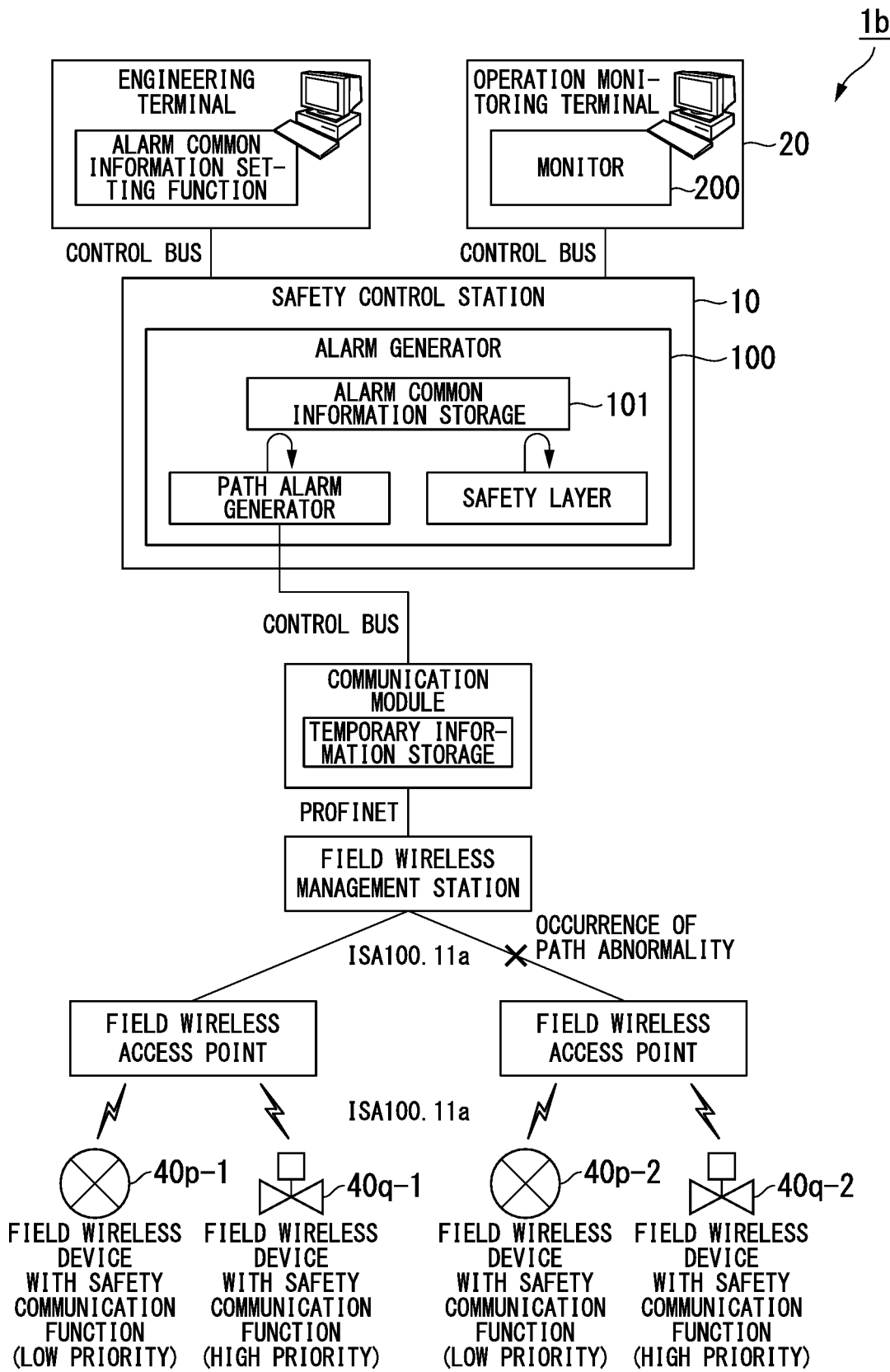
FIG. 9 is a configuration diagram showing an overall configuration of a safety control system according to a second embodiment of the present invention.

FIG. 9 is a configuration diagram showing an overall configuration of a safety control system 1*b* according to the second embodiment of the present invention.

A configuration of the safety control system 1*b* according to the present embodiment is different from the configuration of the safety control system 1*a* according to the first embodiment described above in that each of the field wireless device 40 with safety communication functions with which the safety control station 10 communicates has priority which is preset.

The "priority" described here refers to how important the data transmitted from the field wireless device 40 with safety communication function (for example, a measurement value of a sensor) is (i.e., whether an alarm is an alarm with a higher degree of importance).

As shown in FIG. 9, for example, a "low priority" is set in the field wireless device 40*p*-1 with safety communication function and the field wireless device 40*p*-2 with safety communication function, and a "high priority" is set in the field wireless device 40*q*-1 with safety communication function and the field wireless device 40*q*-2 with safety communication function.

In the alarm common information storage 101 of the alarm generator 100 of the safety control station 10 according to the present embodiment, priority information t3 in which the item of the type of data and the item of the priority are associated is pre-stored in addition to the alarm common information t1.

Figures 10, 11:
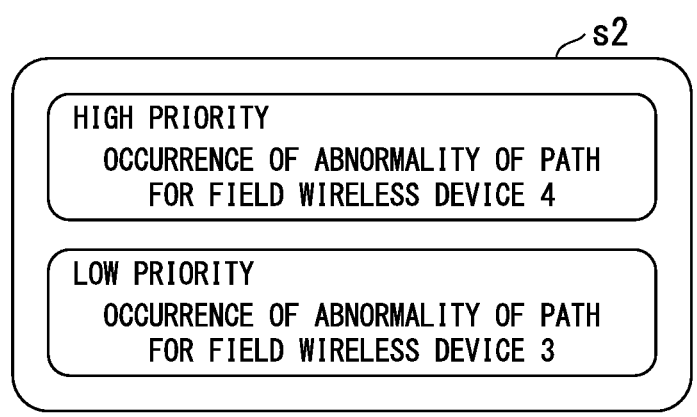
FIG. 10 is a schematic diagram showing a configuration of priority information stored in a safety control station of the safety control system according to the second embodiment of the present invention.
FIG. 11 is a schematic diagram showing an example of an alarm information display screen displayed on an operation monitoring terminal of the safety control system according to the second embodiment of the present invention.

FIG. 10 is a schematic diagram showing a configuration of the priority information t3 stored in the safety control station 10 of the safety control system 1*b* according to the second embodiment of the present invention.

As shown, the priority information t3 is two-dimensional tabular data in which two items such as a priority (a "low priority" or a "high priority") and data ("Data 1", "Data 3", "Data 2", "Data 4", or the like) are associated. That is, the priority information t3 shown in FIG. 10 indicates that "Data 1", "Data 3", or the like is set as low-priority data and "Data 2", "Data 4", or the like is set as high-priority data.

When the alarm information is output to the operation monitoring terminal 20, the safety control station 10 acquires information indicating a priority (a "low priority" or a "high priority") associated with a value of the item of the type of data associated with the alarm information to be output (for example, "Data 1", "Data 2", or the like) from the priority information t3 and outputs alarm information including the acquired information indicating the priority to the operation monitoring terminal 20.

FIG. 11 is a schematic diagram showing an example of an alarm information display screen s2 displayed on the operation monitoring terminal 20 of the safety control system 1*b* according to the second embodiment of the present invention.

When alarm information is acquired from the safety control station 10, the operation monitoring terminal 20 groups the acquired alarm information on the basis of information indicating a priority added to the acquired alarm information. The operation monitoring terminal 20 causes the monitor 200 to display the alarm information for each group (for each priority), for example, as in the alarm information display screen s2 shown in FIG. 11.

According to the above configuration, the safety control system 1*b* according to the second embodiment can present an abnormality and a priority for executing troubleshooting to the user (the operator), so that the user can perform troubleshooting for a generated event more appropriately (for example, in a more appropriate order).

Third Embodiment

Hereinafter, a third embodiment of the present invention will be described.

Figure 12:
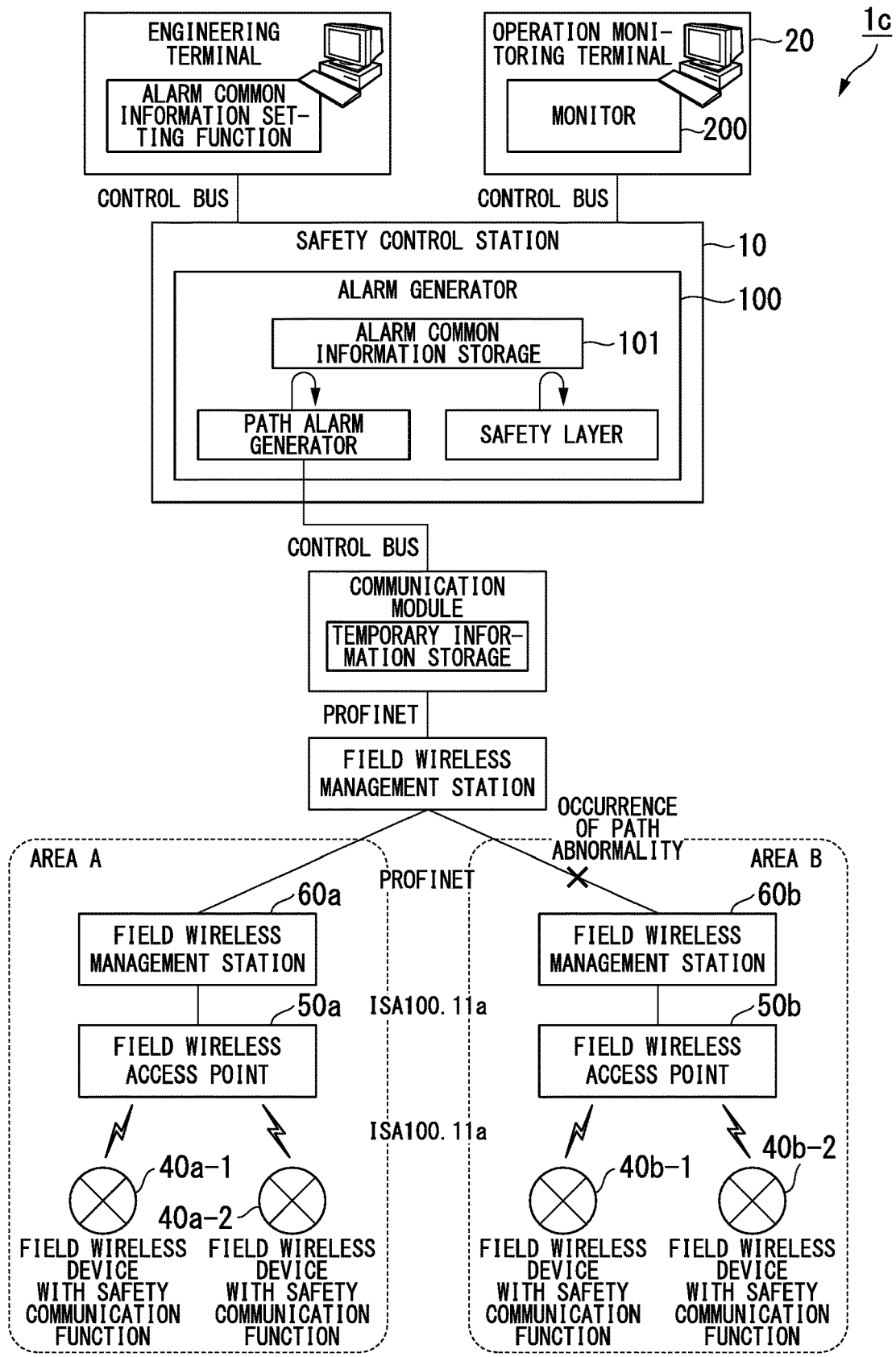
FIG. 12 is a configuration diagram showing an overall configuration of a safety control system according to a third embodiment of the present invention.

FIG. 12 is a configuration diagram showing an overall configuration of a safety control system 1*c* according to the third embodiment of the present invention.

The configuration of the safety control system 1*c* according to the present embodiment is different from the configuration of the safety control system 1*a* according to the first embodiment described above in that a field wireless management station 60 is installed for each area and the field wireless management station 60 manages a field wireless access point 50 and a field wireless device 40 with safety communication function within an area under control.

As shown in FIG. 12, for example, a field wireless device 40*a*-1 with safety communication function, a field wireless device 40*a*-2 with safety communication function, a field wireless access point 50*a*, and a field wireless management station 60*a* for managing them are installed in an area A. For example, a field wireless device 40*b*-1 with safety communication function, a field wireless device 40*b*-2 with safety communication function, a field wireless access point 50*b*, and a field wireless management station 60*b* for managing them are installed in the area B.

In addition to the alarm common information t1, area information t4 in which an item of a type of data and an item of an area are associated is pre-stored in the alarm common information storage 101 of the alarm generator 100 of the safety control station 10 according to the present embodiment.

Figures 13, 14:
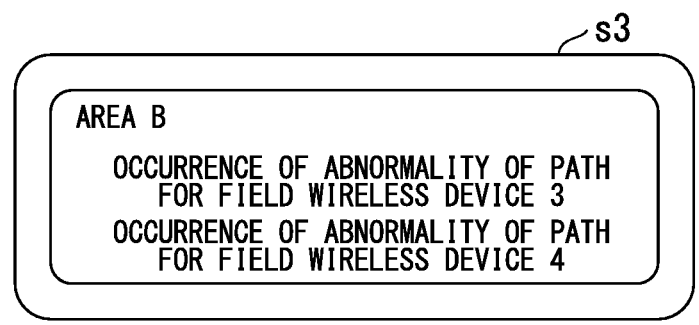
FIG. 13 is a schematic diagram showing a configuration of area information stored in a safety control station of the safety control system according to the third embodiment of the present invention.
FIG. 14 is a schematic diagram showing an example of an alarm information display screen displayed on an operation monitoring terminal of the safety control system according to the third embodiment of the present invention.
Figure 15:
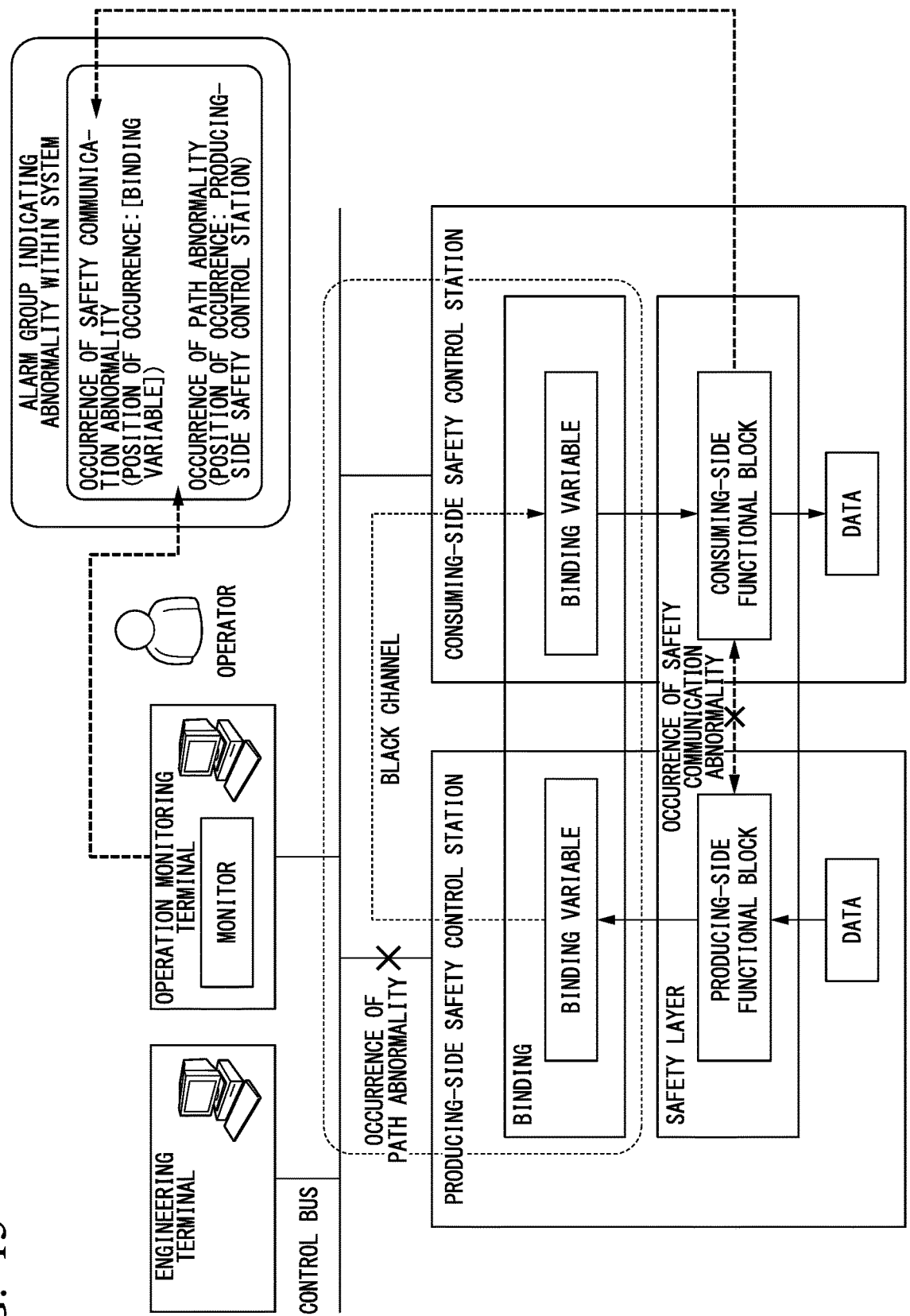
FIG. 15 is a schematic diagram showing an alarm notification process of a safety control system according to a related art.

FIG. 13 is a schematic diagram showing a configuration of area information t4 stored in the safety control station 10 of the safety control system 1c according to the third embodiment of the present invention.

As shown, the area information t4 is two-dimensional tabular data in which two items of an area ("Area A" or "Area B") and data ("Data 1", "Data 2", "Data 3", "Data 4", or the like) are associated. That is, the area information t4 shown in FIG. 13 indicates that "Data 1", "Data 2", and the like are set in association with Area A and "Data 3", "Data 4", and the like are set in association with Area B.

When the alarm information is output to the operation monitoring terminal 20, the safety control station 10 acquires information indicating an area associated with a value of a type of data associated with alarm information to be output (for example, "Data 1" or "Data 2") ("Area A" or "Area B") from the area information t4 and outputs alarm information including the acquired information indicating the area to the operation monitoring terminal 20.

FIG. 14 is a schematic diagram showing an example of an alarm information display screen s3 displayed on the operation monitoring terminal 20 of the safety control system 1c according to the third embodiment of the present invention.

When the operation monitoring terminal 20 acquires the alarm information from the safety control station 10, the acquired alarm information is grouped for each area on the basis of information indicating the area added to the acquired alarm information. The operation monitoring terminal 20 causes the monitor 200 to display alarm information for each group (each area), for example, as in the alarm information display screen s3 shown in FIG. 14.

According to the above configuration, because the safety control system 1c according to the third embodiment can present the occurrence of an abnormality and an area where the abnormality has occurred to the user (the operator), the user can more quickly identify the area where the abnormality has occurred and more appropriately perform troubleshooting for a generated event.

Fourth Embodiment

Hereinafter, a fourth embodiment of the present invention will be described.

When an abnormality cause is removed by performing troubleshooting, notifications of restoration alarms related to the abnormality cause may be simultaneously provided. The safety control station according to the present embodiment includes a restoration controller (not shown). On the basis of the tag information set in the alarm common information, the restoration controller (not shown) groups the restoration alarms related to the same abnormality cause and outputs restoration alarm information including information indicating the grouping to the operation monitoring terminal.

Thereby, the operation monitoring terminal can group restoration alarms related to the same abnormality cause to cause the monitor to display the grouped restoration alarms. The operation monitoring terminal displays am interface of an Ack operation (an approval operation of the operator who approves the restoration) (for example, an approval button) for each group, so that the operator can collectively perform Ack operations on all restoration alarms related to the same abnormality cause.

When information indicating the collective restoration approval based on the above-described Ack operation is acquired, the restoration controller (not shown) causes a value of an item of a status of safety communication and a value of an item of a statue of a path associated with the collective restoration approval to be updated (causes the status to be updated to a normal status) in the alarm common information.

The restoration controller may cause the alarm common information about the restoration alarm related to the same abnormality cause to be automatically updated to a normal status on the basis of tag information set in the alarm common information and to be automatically restored without causing the alarm common information to be updated to the normal status on the basis of the acquisition of information indicating a collective restoration approval based on the Ack operation as described above.

According to the above configuration, because the safety control system according to the fourth embodiment can provide the user (the operator) with an interface for collectively performs the Ack operations on the restoration alarms related to the same abnormality cause, the user can more easily perform the Ack operations.

Fifth Embodiment

Hereinafter, a fifth embodiment of the present invention will be described.

If a path abnormality has occurred, safety communication also becomes abnormal due to the path abnormality. However, in this case, there may be a time lag between the occurrence of the path abnormality and the occurrence of the safety communication abnormality. Thus, according to the safety control system according to the present embodiment, because it is possible to associate the path abnormality and the safety communication abnormality caused by the same cause, a configuration in which a safety control station causes a pre-notification alarm for providing a pre-notification of a safety communication abnormality estimated to occur thereafter to be generated when a path abnormality occurs can be adopted.

By providing the notification of the pre-notification alarm of the occurrence of the safety communication abnormality, for example, the operator can prepare for curing work when the safety communication abnormality occurs. Thereby, according to the safety control system of the present embodiment, the user can cope with the safety communication abnormality more quickly.

Sixth Embodiment

Hereinafter, a sixth embodiment of the present invention will be described.

Although a user (an operator) sets alarm common information according to an engineering function in the above-described embodiment, the safety control station automatically may set the alarm common information. The safety control station performs a process of determining that a plurality of pieces of alarm information are alarm information of a notification provided by the same cause and the safety control station assigns a common identifier to a plurality of pieces of alarm information determined to be the alarm information of the notification provided by the same cause.

Thereby, the safety control system according to the present embodiment can cause the monitor of the operation monitoring terminal to display a plurality of piece of alarm information of a notification provided due to the same cause by using a user interface with which the user (the operator) can easily perform association.

As described above, the safety control system according to the embodiment of the present invention described above can output information associated with notification information generated by different detection logics with respect to the same event.

Although it is assumed that PROFIsafe (registered trademark) is used for safety communication and PROFINET (registered trademark) and ISA 100.11a are used for the black channel in the above-described embodiment, the present invention is not an invention using characteristics of these communication protocols. Therefore, the present invention can be applied to any system using any communication protocol as long as it is a system for providing notifications of a plurality of types of alarms for the same cause.

A part or all of the safety control system in the above-described embodiment may be implemented by a computer. In this case, a control function thereof may be implemented by recording a part or all of a program for implementing the control function on a computer-readable storage medium and causing a computer system to read and execute the program recorded on the storage medium.

The "computer system" described here is assumed to be a computer system embedded in the safety control system and include an operating system (OS) and hardware such as peripheral devices. The "computer-readable storage medium" refers to a storage device including a flexible disk, a magneto-optical disc, a read only memory (ROM), a portable medium such as a compact disc (CD)-ROM, and a hard disk embedded in the computer system.

Further, the "computer-readable storage medium" is assumed to include a computer-readable storage medium for dynamically holding a program for a short time as in a communication line when the program is transmitted via a network such as the Internet or a communication line such as a telephone line and a computer-readable storage medium for holding the program for a predetermined time as in a volatile memory inside the computer system including a server and a client when the program is transmitted. Also, the above-described program may be used to implement some of the above-described functions. Further, the program may implement the above-described functions in combination with a program already recorded on the computer system.

A part or all of the safety control system in the above-described embodiment may be implemented as an integrated circuit such as large scale integration (LSI). Each of the functional blocks of the safety control system may be individually formed as a processor or a part or all thereof may be integrated into a processor. A method of forming an integrated circuit is not limited to LSI, and may be implemented by a dedicated circuit or a general-purpose processor. When the technology of an integrated circuit with which LSI is replaced emerges with the advancement of semiconductor technology, the integrated circuit based on the technology may be used.

What is claimed is:

1. A notification control device, comprising:
a processor configured to execute instructions to:
   detect a status of a first communication protocol of communication between a first device and a second device in a process control system; and
   detect a status of a second communication protocol different from the first communication protocol of the communications; and
a storage storing notification common information, the notification common information being data in which the status of the first communication protocol and the status of the second communication protocol are associated with the same tag information,
wherein the status of the first communication protocol is a status of safety communication,
wherein the status of the second communication protocol is a status of a communication path,
wherein in a case where the status of the first communication protocol is changed from normal status to abnormal status, the processor is configured to execute the instructions to acquire, from the storage, the tag information associated with the status of the first communication protocol in the notification common information, to generate a safety communication abnormality alarm to which the acquired tag information is added, and to input the safety communication abnormality alarm into an operation monitoring terminal, and
wherein in a case where the status of the second communication protocol is changed from normal status to abnormal status, the processor is configured to execute the instructions to acquire, from the storage, the tag information associated with the status of the second communication protocol in the notification common information, to generate a path abnormality alarm to which the acquired tag information is added, and to input the path abnormality alarm into the operation monitoring terminal.

2. The notification control device according to claim 1, wherein the status of the first communication protocol to be detected and the status of the second communication protocol to be detected are statuses based on the same condition of the communication.

3. The notification control device according to claim 1, wherein the first device is a controller and the second device is a field device.

4. The notification control device according to claim 1, wherein the processor is further configured to execute the instructions
to generate a pre-notification alarm indicating a pre-notification of the status of the first communication protocol on the basis of the tag information associated with the status of the second communication protocol in a case where the processor has detected the status of the second communication protocol.

5. The notification control device according to claim 1, wherein the processor is further configured to execute the instructions
to determine whether or not notifications of the detected status of the first communication protocol and the detected status of the second communication protocol have been provided due to the same cause and add common tag information with respect to the detected status of the first communication protocol and the detected status of the second communication protocol in a case where the processor determines that the notifications have been provided due to the same cause.

6. The notification control device according to claim 1, wherein information indicating a notification priority on the basis of the safety communication abnormality alarm or the path abnormality alarm is further associated with the notification common information.

7. The notification control device according to claim 1, wherein information indicating an area where the second device is installed is further associated with the notification common information.

8. The notification control device according to claim 1, wherein the processor is further configured to execute the instructions
to update, to normal status, the safety communication abnormality alarm and the path abnormality alarm generated on the basis of the status of the first communication protocol and the status of the second communication protocol associated with the same tag information in a case where information indicating a collective restoration approval is acquired.

9. The notification control device according to claim 1, wherein the processor is configured to execute the instructions to acquire information indicating the status of safety communication, to update information indicating the status of the safety communication in the notification common information stored in the storage according to the acquired information indicating the status of the safety communication, and to detect abnormality of the safety communication by searching for the status of the safety communication indicating safety communication abnormality in the notification common information stored in the storage, and
wherein the processor is configured to execute the instructions to acquire information indicating the status of the communication path, to update information indicating the status of the communication path of the notification common information stored in the storage according to the acquired information indicating the status of the communication path, and to detect abnormality of the communication path by searching for the status of the communication path indicating communication path abnormality in the notification common information stored in the storage.

10. A notification control system comprising a first device, a second device, a notification control device, and an operation monitoring terminal in a process control system,
wherein the notification control device comprises:
a processor configured to execute instructions to:
detect a status of a first communication protocol of communication between the first device and the second device; and
detect a status of a second communication protocol different from the first communication protocol of the communications; and
a storage storing notification common information, the notification common information being data in which the status of the first communication protocol and the status of the second communication protocol are associated with the same tag information,
wherein the status of the first communication protocol is a status of safety communication,
wherein the status of the second communication protocol is a status of a communication path,
wherein in a case where the status of the first communication protocol is changed from normal status to abnormal status, the processor is configured to execute the instructions to acquire, from the storage, the tag information associated with the status of the first communication protocol in the notification common information, to generate a safety communication abnormality alarm to which the acquired tag information is added, and to input the safety communication abnormality alarm into an operation monitoring terminal, and
wherein in a case where the status of the second communication protocol is changed from normal status to abnormal status, the processor is configured to execute the instructions to acquire, from the storage, the tag information associated with the status of the second communication protocol in the notification common information, to generate a path abnormality alarm to which the acquired tag information is added, and to input the path abnormality alarm into the operation monitoring terminal.

11. The notification control system according to claim 10, further comprising:
a communication module comprising a temporary information storage storing the status of the second communication protocol,
wherein the processor is configured to execute the instructions to refer to the status of the second communication protocol stored in the temporary information storage of the communication module to detect the status of the second communication protocol.

12. The notification control system according to claim 10, further comprising:
an engineering terminal configured to associate the status of the first communication protocol, the status of the second communication protocol, and the tag information.

13. A notification control method using a computer, comprising:
detecting a status of a first communication protocol of communication between a first device and a second device in a process control system, the status of the first communication protocol being a status of safety communication;
detecting a status of a second communication protocol different from the first communication protocol of the communication, the status of the second communication protocol being a status of a communication path;
storing notification common information in a storage, the notification common information being data in which the status of the first communication protocol and the status of the second communication protocol are associated with the same tag information;
in a case where the status of the first communication protocol is changed from normal status to abnormal status, acquiring, from the storage, the tag information associated with the status of the first communication protocol in the notification common information, generating a safety communication abnormality alarm to which the acquired tag information is added, and inputting into an operation monitoring terminal the safety communication abnormality alarm; and
in a case where the status of the second communication protocol is changed from normal status to abnormal status, acquiring, from the storage, the tag information associated with the status of the second communication protocol in the notification common information, generating a path abnormality alarm to which the acquired tag information is added, and inputting into the operation monitoring terminal the path abnormality alarm.

14. The notification control method according to claim 13, further comprising:
acquiring information indicating the status of safety communication, updating information indicating the status of the safety communication in the notification common information stored in the storage according to the acquired information indicating the status of the safety communication, and detecting abnormality of the safety communication by searching for the status of the safety communication indicating safety communication abnormality in the notification common information stored in the storage, and acquiring information indicating the status of the communication path, updating information indicating the status of the communication path of the notification common information stored in the storage according to the acquired information indicating the status of the communication path, and detecting abnormality of the communication path by searching for the status of the communication path indicating communication path abnormality in the notification common information stored in the storage.

15. A non-transitory computer-readable storage medium storing a notification control program, which when executed by a computer, causes the computer to perform;

detecting a status of a first communication protocol of communication between a first device and a second device in a process control system, the status of the first communication protocol being a status of safety communication;

detecting a status of a second communication protocol different from the first communication protocol of the communication, the status of the second communication protocol being a status of a communication path;

storing notification common information in a storage, the notification common information being data in which the status of the first communication protocol and the status of the second communication protocol are associated with the same tag information;

in a case where the status of the first communication protocol is changed from normal status to abnormal status, acquiring, from the storage, the tag information associated with the status of the first communication protocol in the notification common information, generating a safety communication abnormality alarm to which the acquired tag information is added, and inputting into an operation monitoring terminal the safety communication abnormality alarm; and in a case where the status of the second communication protocol is changed from normal status to abnormal status, acquiring, from the storage, the tag information associated with the status of the second communication protocol in the notification common information, generating a path abnormality alarm to which the acquired tag information is added, and inputting into the operation monitoring terminal the path abnormality alarm.

16. The non-transitory computer-readable storage medium according to claim 15, wherein the notification control program, which when executed by the computer, further causes the computer to perform acquiring information indicating the status of safety communication, updating information indicating the status of the safety communication in the notification common information stored in the storage according to the acquired information indicating the status of the safety communication, and detecting abnormality of the safety communication by searching for the status of the safety communication indicating safety communication abnormality in the notification common information stored in the storage, and wherein the notification control program, which when executed by the computer, further causes the computer to perform acquiring information indicating the status of the communication path, updating information indicating the status of the communication path of the notification common information stored in the storage according to the acquired information indicating the status of the communication path, and detecting abnormality of the communication path by searching for the status of the communication path indicating communication path abnormality in the notification common information stored in the storage.

* * * * *